(12) United States Patent
Sherman et al.

(10) Patent No.: US 7,562,897 B1
(45) Date of Patent: Jul. 21, 2009

(54) COLLAPSIBLE TRANSPORT CART

(76) Inventors: Arnold Sherman, 6345 30 St. S., St. Petersburg, FL (US) 33712; Lindy Sherman, 6345 30 St. S., St. Petersburg, FL (US) 33712

( * ) Notice: Subject to any disclaimer, the term of this patent is extended or adjusted under 35 U.S.C. 154(b) by 356 days.

(21) Appl. No.: 11/705,712

(22) Filed: Feb. 12, 2007

Related U.S. Application Data

(60) Provisional application No. 60/772,967, filed on Feb. 13, 2006.

(51) Int. Cl.
 *B62B 3/02* (2006.01)
(52) U.S. Cl. .............. 280/651; 280/639; 280/47.34; 280/79; 280/79.11; 280/79.3; 211/186; 211/187; 211/207
(58) Field of Classification Search .......... 280/639, 280/651, 47.34, 79, 79.11, 79.3; 211/186, 211/187, 207; 108/56.1, 56.3, 106, 107, 108/108, 109, 147.12; 220/6
See application file for complete search history.

(56) References Cited

U.S. PATENT DOCUMENTS

| | | | |
|---|---|---|---|
| 1,855,020 A * | 4/1932 | Henrichsen | 244/109 |
| 1,912,864 A | 6/1933 | Stannard | |
| 3,985,083 A * | 10/1976 | Pofferi | 108/192 |
| 4,523,768 A | 6/1985 | Dlubala | |
| 4,887,836 A * | 12/1989 | Simjian | 280/651 |
| 5,495,951 A | 3/1996 | Biasini | |
| 5,957,614 A * | 9/1999 | Aurich | 403/170 |
| 6,079,719 A * | 6/2000 | Tisbo et al. | 280/47.35 |
| 6,305,599 B2 * | 10/2001 | Tsubaki et al. | 229/122.23 |
| 6,820,878 B2 * | 11/2004 | Safari et al. | 280/47.26 |
| 7,360,783 B2 * | 4/2008 | Home | 280/639 |
| 2001/0050517 A1 * | 12/2001 | Spitzer et al. | 312/249.8 |

* cited by examiner

*Primary Examiner*—Christopher P Ellis
*Assistant Examiner*—Bryan A Evans (57) ABSTRACT

A collapsible transport cart includes a bottom wall with a planar top surface, and a plurality of apertures formed in opposed corners thereof. First and second axially opposed walls are attached to the bottom wall, and third and fourth walls are attached to opposed longitudinal edges thereof. A plurality of brackets is removably mated with top edges of the walls such that a rectangular cavity is defined within an interior perimeter thereof. A plurality of shelves and caster assemblies is adjustably mated to the bottom wall. A mechanism adjustably and removably supports the shelves within the cavity such that the shelves remain statically nested within the cavity when the walls are biased to a horizontal and open position.

15 Claims, 9 Drawing Sheets

COLLAPSIBLE TRANSPORT CART

CROSS REFERENCE TO RELATED APPLICATIONS

This application claims the benefit of U.S. Provisional Application No. 60/772,967, filed Feb. 13, 2006, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to carts and, more particularly, to a collapsible transport cart for storing and carrying objects between remote locations.

2. Prior Art

There are many situations which require, for example, a multitude of items, tools, or pieces of equipment to be transported to a remote location. Often a truck or van is used to transport these items and then a person or person unloads and carries the items to the site where they are to be used. Afterwards the items need to be carried back to and loaded into the transport vehicle. This loading, unloading, and carrying can be very time and labor intensive. The subject invention relates to a mobile cart which can be used to save much of this time and labor. The subject cart can be utilized to facilitate the loading, unloading, and carrying of items in a variety of settings, including carrying tools, laundry, paints, electrical supplies, carpentry equipment, dry cleaning equipment, mobile office equipment, disc jockey equipment, landscaping equipment, or any other materials which are heavy and/or need to be frequently loaded and unloaded.

One prior art example shows a universal tool transport cart for large workbench tools, hand tools, work supplies, safety equipment, and miscellaneous accessories that is mounted on wheels for easy movement around a shop area. More particularly, the cart includes a lower base unit mounted on four caster wheels. The base unit includes two opposite end storage areas, a central storage area, and a flat top surface. Attached to the top surface of the base unit is a trapezoidal unit designed to hold various workbench tools, such as a band saw, a joiner, sander, and the like. The trapezoidal unit is shorter in length than the base unit thereby enabling one end of the base unit's top surface to be used as a horizontal workbench. The front and rear end openings are formed into the trapezoidal unit enable elongated tools and machine accessories to be stored longitudinally under the trapezoidal unit and over the top surface of the base unit. Unfortunately, this prior art example does include retractable casters for allowing a user to remove the casters as desired.

Another prior art example shows a utility cart which includes means for attachment to a common bicycle or which can be drawn by hand. The cart includes a main body compartment formed from a bottom panel, two side panels and a front and a back panel. Two wheels are attached to an axle which is attached to the bottom panel of the main body compartment via a selection of axle supports, and includes front and rear exterior equipment retaining modules in the form of cylindrical units having bottom stops. Any number of equipment retaining modules are envisioned and the preferred embodiment shown and described herein includes four in the front and four in the rear. Means for attachment to a typical prior art bicycle is included. The means for attachment permits rotation along three planes thereby providing the smoothest possible transport of the cart and items contained therein. Removable legs are provided which can be attached if the cart is to be stationary, or can be removed when the utility cart is to be in motion. Unfortunately, this prior art example is designed for use with a bicycle, and is not suitable for use in an industrial or warehouse type of environment.

Accordingly, a need remains for a collapsible transport cart in order to overcome the above-noted shortcomings. The present invention satisfies such a need by providing an apparatus that is convenient and easy to use, is lightweight yet durable in design, and provides a means for storing and carrying objects between remote locations. Such a cart provides consumers with a practical assist when moving large, bulky or heavy furnishings. Boasting an ample base platform, supportive side walls, as well as several removable storage shelves, the cart can move everything from full size desks, to stacks of chairs, to computers and printers, with ease. Regardless of whether utilizing the attached wheels or the ergonomically designed handles, the cart enables consumers to move a wide variety of items in a comfortable and simple manner. Eliminating the awkward attempts to gain a firm hand on items such as ottomans, entertainment centers, hutches and virtually any other tall, large or bulky furnishing, the cart facilitates a steady and secure grip during transport, thus ensuring that these items are safely transported. The cart protects the movers themselves from the back pain, crushed toes and similar injuries which often result when one accidentally drops furniture or similar heavy goods when moving them from one location to the next.

BRIEF SUMMARY OF THE INVENTION

In view of the foregoing background, it is therefore an object of the present invention to provide an apparatus for a collapsible transport cart. These and other objects, features, and advantages of the invention are provided by a collapsible transport cart for storing and carrying objects between remote locations.

The apparatus includes a bottom wall that has a planar top surface effectively elevated above a ground surface during transport procedures, and a plurality of apertures conveniently formed in opposed corners thereof respectively. First and second axially opposed walls are pivotally attached to the bottom wall and registered orthogonal to a centrally positioned longitudinal axis of the bottom wall.

The apparatus further includes third and fourth walls pivotally attached to opposed longitudinal edges of the bottom wall. The first and second walls advantageously pivot about first and second co-planar axes registered parallel to each other. The third and fourth walls are advantageously pivotal about co-planar axes registered parallel to each other and further registered orthogonally to the axes of the first and second walls. The axes of the first and second walls are effectively disposed above the axes of the third and fourth walls respectively such that the first and second walls horizontally lay directly on the third and fourth walls during non-transport procedures. Each of the first, second, third, and fourth walls are independently and simultaneously articulated about intersecting arcuate paths inwardly effectively defined within a perimeter of the bottom wall.

The apparatus further includes a plurality of L-shaped brackets removably mated with contiguously abutted top edges of the first, second, third, and fourth walls such that a rectangular cavity is effectively defined within an interior perimeter of the first, second, third and fourth walls respectively. The apparatus further includes a plurality of shelves, a plurality of spring-loaded and detachable caster assemblies adjustably mated to the bottom wall, and a mechanism for adjustably and removably supporting the shelves within the cavity such that the shelves advantageously remain statically nested within the cavity when the first, second, third, and fourth walls are biased to a horizontal and open position.

The shelves supporting mechanism includes a plurality of elongated and rectilinear rods vertically anchored within the apertures and extending upwardly therefrom while advantageously remaining registered orthogonally to the bottom wall. Each of the rods conveniently has a plurality of notches formed therein, and each of the notches is equidistantly juxtaposed along a longitudinal length of the rods. Such notches face inwardly towards a center of the bottom wall. A plurality of pegs has arcuate inner surfaces firmly abutted against associated ones of the rods, and each of the pegs further has male portions removably interfitted within the notches such that the pegs advantageously remain statically affixed to the rods during transport procedures. Each of the shelves is conveniently provided with arcuately shaped opposed corners directly engaged with an outer surface of the rods and directly seated on the pegs during transport procedures respectively.

The spring-loaded caster assemblies include a caster, and an anchor bracket and a deformably resilient spring member that has opposed ends directly engaged with a bottom surface of the anchor bracket and a bottom surface of the bottom wall respectively. A linear axle is directly coupled to the anchor bracket and advantageously extends horizontally outward therefrom. The caster is journaled about the axle. A deformably resilient arm that has first and second portions is directly anchored to the bottom wall and the axle respectively. Such an arm automatically flexes between compressed and elongated positions when the spring member is biased between elongated and compressed positions respectively.

A method for storing and carrying objects between remote locations includes the steps of providing a bottom wall that has a planar top surface elevated above a ground surface during transport procedures. The bottom wall has a plurality of apertures formed in opposed corners thereof respectively. The steps further include pivotally attaching first and second axially opposed walls to the bottom wall and registered orthogonal to a centrally positioned longitudinal axis of the bottom wall, and pivotally attaching third and fourth walls to opposed longitudinal edges of the bottom wall. The first and second walls pivot about first and second co-planar axes registered parallel to each other, and the third and fourth walls are pivotal about co-planar axes registered parallel to each other and further registered orthogonally to the axes of the first and second walls. The axes of the first and second walls are disposed above the axes of the third and fourth walls respectively such that the first and second walls horizontally lay directly on the third and fourth walls during non-transport procedures.

The steps further include removably mating a plurality of brackets with the contiguously abutted top edges of the first, second, third, and fourth walls such that a rectangular cavity is defined within an interior perimeter of the first, second, third and fourth walls respectively, providing a plurality of shelves, adjustably mating a plurality of spring-loaded and detachable caster assemblies to the bottom wall, and removably supporting the shelves within the cavity such that the shelves remain statically nested within the cavity when the first, second, third, and fourth walls are biased to a horizontal and open position.

The steps further include vertically anchoring a plurality of elongated and rectilinear rods within the apertures and extending upwardly therefrom while remaining registered orthogonally to the bottom wall. Each of the rods has a plurality of notches formed therein, and each of the notches is equidistantly juxtaposed along a longitudinal length of the rods. The notches face inwardly towards a center of the bottom wall. The steps further include firmly abutting a plurality of pegs that have arcuate inner surfaces against associated ones of the rods. Each of the pegs further has male portions removably interfitted within the notches such that the pegs remain statically affixed to the rods during transport procedures. Each of the shelves is provided with arcuately shaped opposed corners directly engaged with an outer surface of the rods and directly seated on the pegs during transport procedures respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-11B by the reference numeral 10 and is intended to provide a collapsible transport cart. It should be understood that the apparatus 10 may be used to transport and store many different types of objects in many different types of environments and should not be limited in use to transporting and storing only those types of objects described herein.

Referring to FIGS. 1, 2, 3, 4, 5, 6, 10, 11A and 11B, the apparatus 10 includes a bottom wall 20 that has a planar top surface 21 elevated above a ground surface during transport procedures, and a plurality of apertures 22 formed in opposed corners 23 thereof respectively. First 24 and second 25 axially opposed walls are pivotally attached to the bottom wall 20 and registered orthogonal to a centrally positioned longitudinal axis of the bottom wall 20. The bottom wall 20 provides a suitably sized and shaped platform for allowing a user to stack materials needing to be transported or stored.

Referring to FIGS. 1, 2, 3, 4, 6, 9, 11A and 11B, the apparatus 10 further includes third 26 and fourth 27 walls pivotally attached to opposed longitudinal edges of the bottom wall 20. The first and second walls 24, 25 advantageously pivot about first and second co-planar axes registered parallel to each other. The third and fourth walls 26, 27 are advantageously pivotal about co-planar axes registered parallel to each other and further registered orthogonally to the axes of the first and second walls 24, 25. The axes of the first and second walls 24, 25 are disposed above the axes of the third and fourth walls 26, 27 respectively such that the first and second walls 24, 25 horizontally lay directly on the third and fourth walls 26, 27 during non-transport procedures. Each of the first, second, third, and fourth walls 24, 25, 26, 27 are independently and simultaneously articulated about intersecting arcuate paths inwardly defined within a perimeter of the bottom wall 20.

The ability of a user to independently and simultaneously articulate the first, second, third and fourth walls, 24, 25, 26, 27 allows a user to selectively access different portions of the cavity 30 (herein described below) during transport procedures. This allows a user to also transport or store elongated and odd-shaped objects within the cavity 30 (herein described below) by articulating the desired wall 24, 25, 26, 27 to the vertical or horizontal position as needed.

Referring to FIGS. 1, 3, 4, 5, and 6, the apparatus 10 further includes a plurality of L-shaped brackets 29 removably mated with contiguously abutted top edges 31 of the first, second, third, and fourth walls 24, 25, 26, 27 such that a rectangular cavity 30 is defined within an interior perimeter of the first, second, third and fourth walls 24, 25, 26, 27 respectively. The brackets 29 maintain the shape of the cavity 30 against an outward force directed against an inner surface of the cavity 30 by the objects placed therein. The apparatus 10 further includes a plurality of shelves 32 for separating the interior of the cavity 30 into discrete compartments based on user need.

Figure 11A:
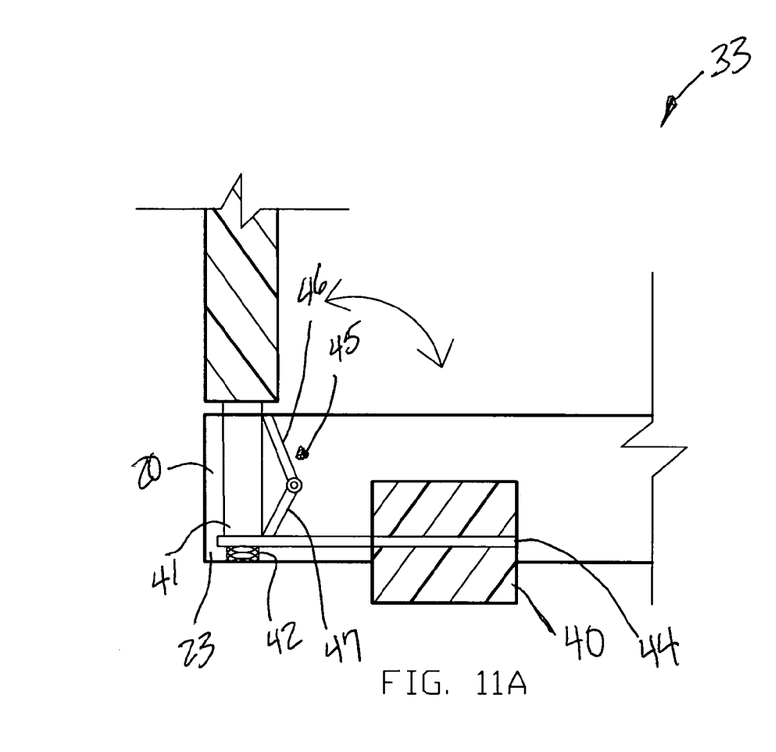
FIG. 11A is a cross sectional view of the system shown in FIG. 1, taken along line 11-11, and showing the caster assembly in an extended position.
Figure 11B:
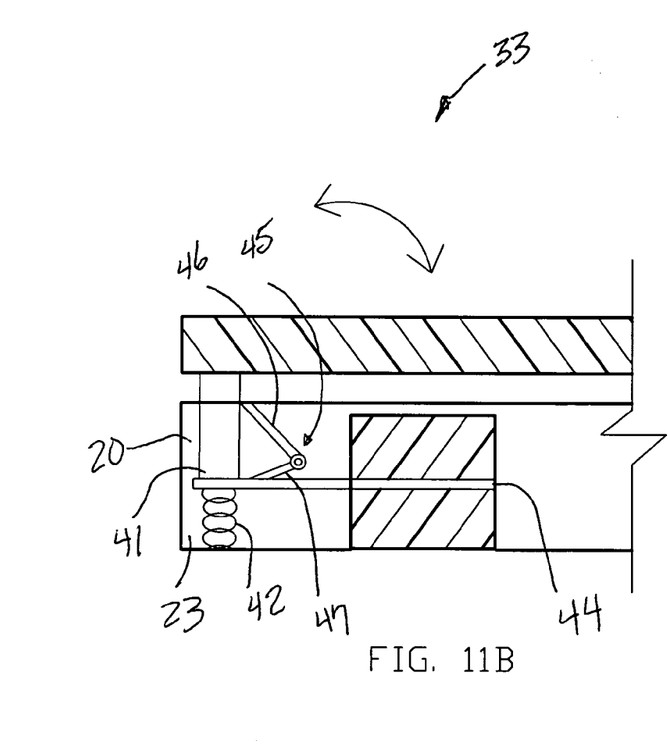
FIG. 11B is a cross sectional view of the assembly shown in FIG. 1, taken along line 11-11, and showing the caster assembly at a retracted position.

Referring to FIGS. 11A and 11B, a plurality of spring-loaded and detachable caster assemblies 33 is adjustably mated to the bottom wall 20. The casters 33 allow a user to remove the casters 33 as necessary for safety purposes. For example, if a user wishes to place the loaded apparatus 10 upon an elevated surface, such as a shelf or scaffolding, the user will remove the casters 33 from the bottom wall 20, and thereby eliminate the possibility of the apparatus 10 prematurely and undesirably moving from the stored position, thereby preventing injury to a user, and damage to the items stored within the apparatus 10.

Figure 1:
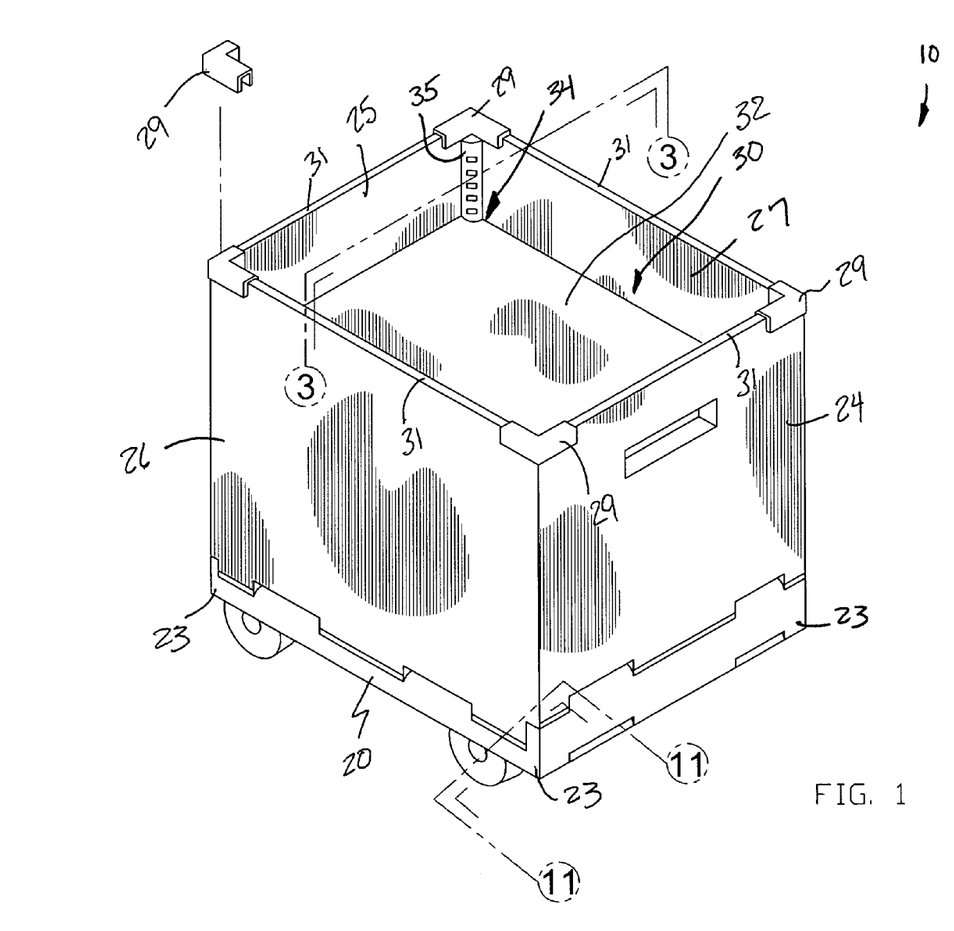
FIG. 1 is a perspective view of a collapsible transport cart, in accordance with the present invention.
Figure 2:
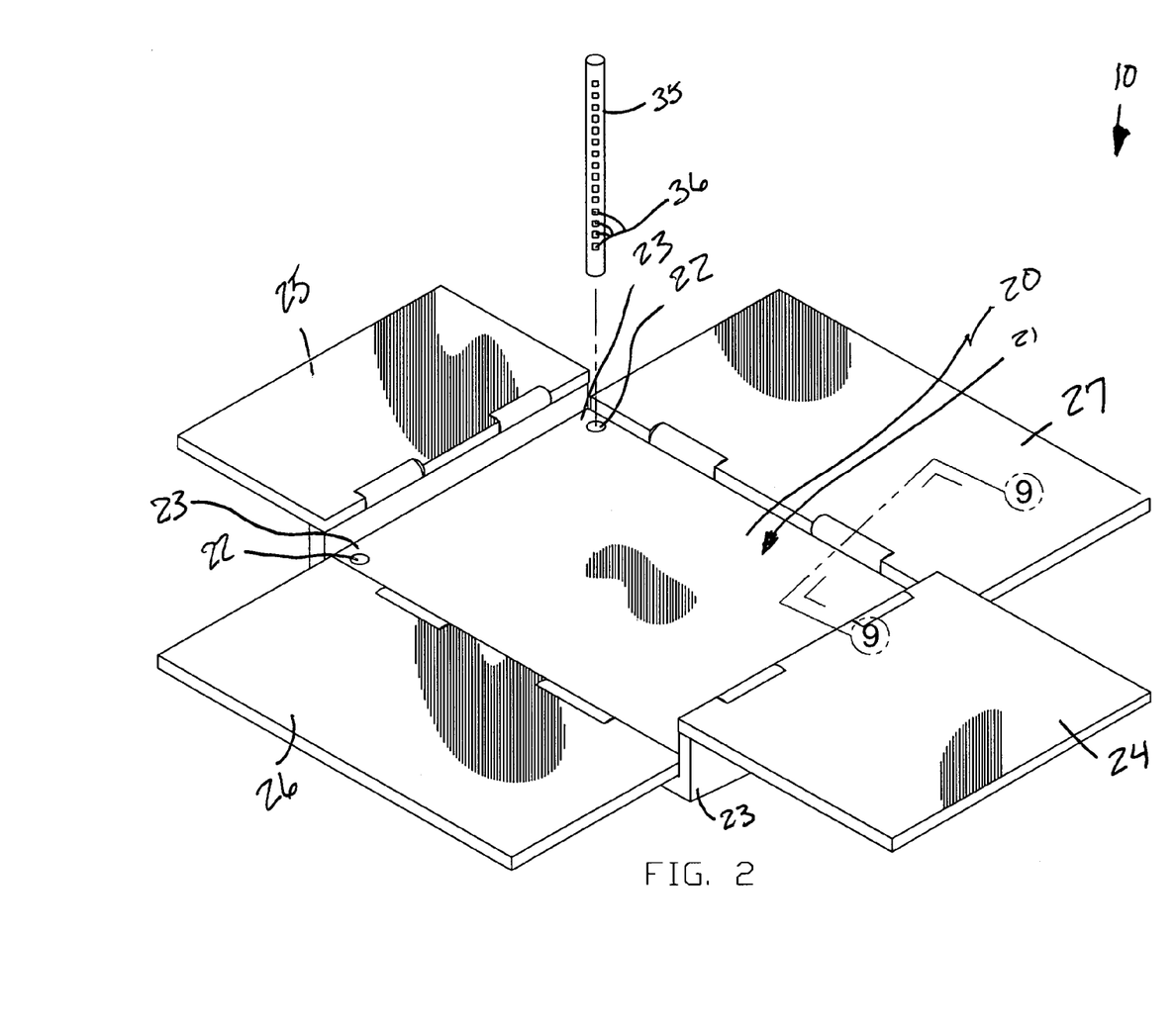
FIG. 2 is a perspective view of the system shown in FIG. 1, showing the walls biased outwardly to a horizontal position.
Figure 3:
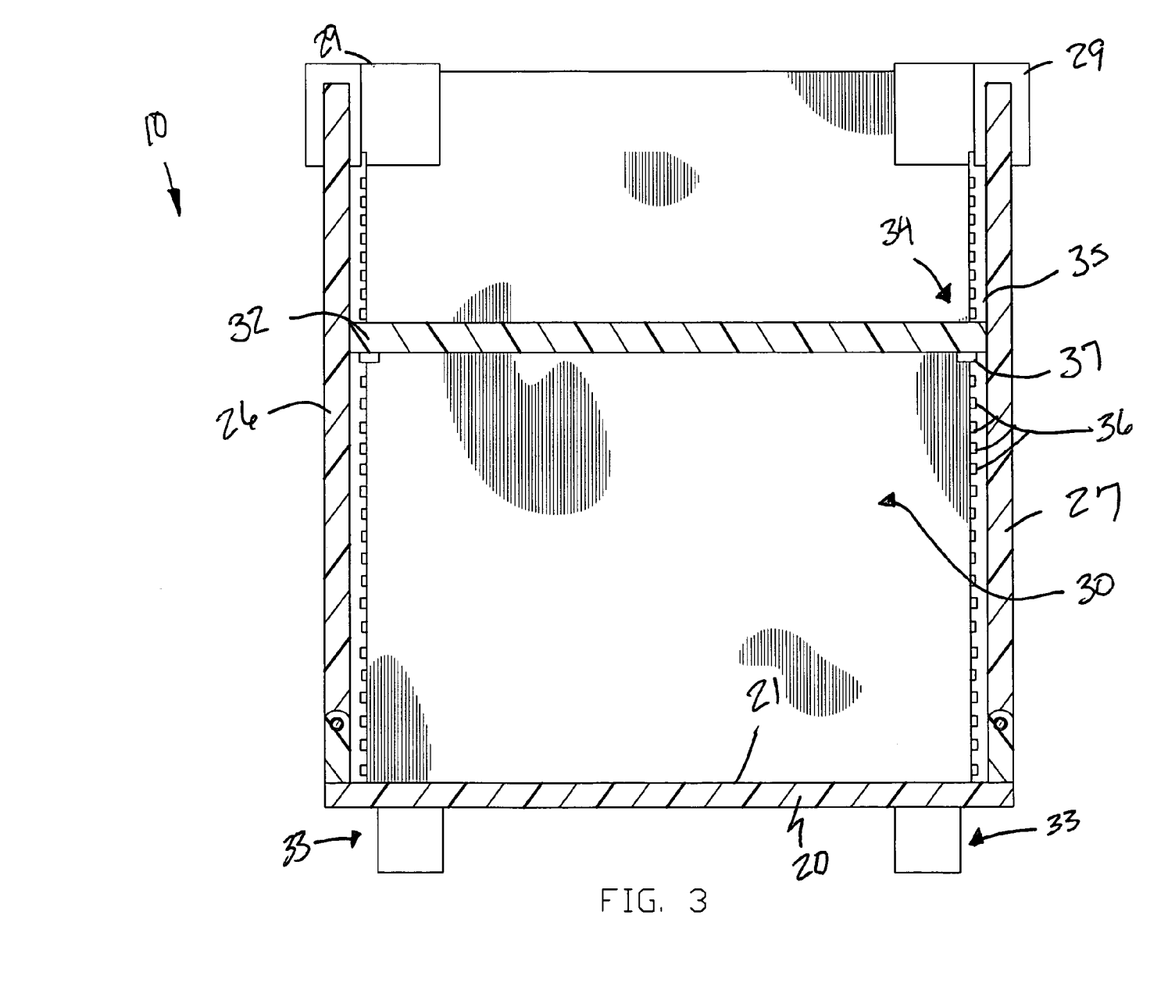
FIG. 3 is a cross sectional view of the system shown in FIG. 1, taken along line 3-3.
Figure 4:
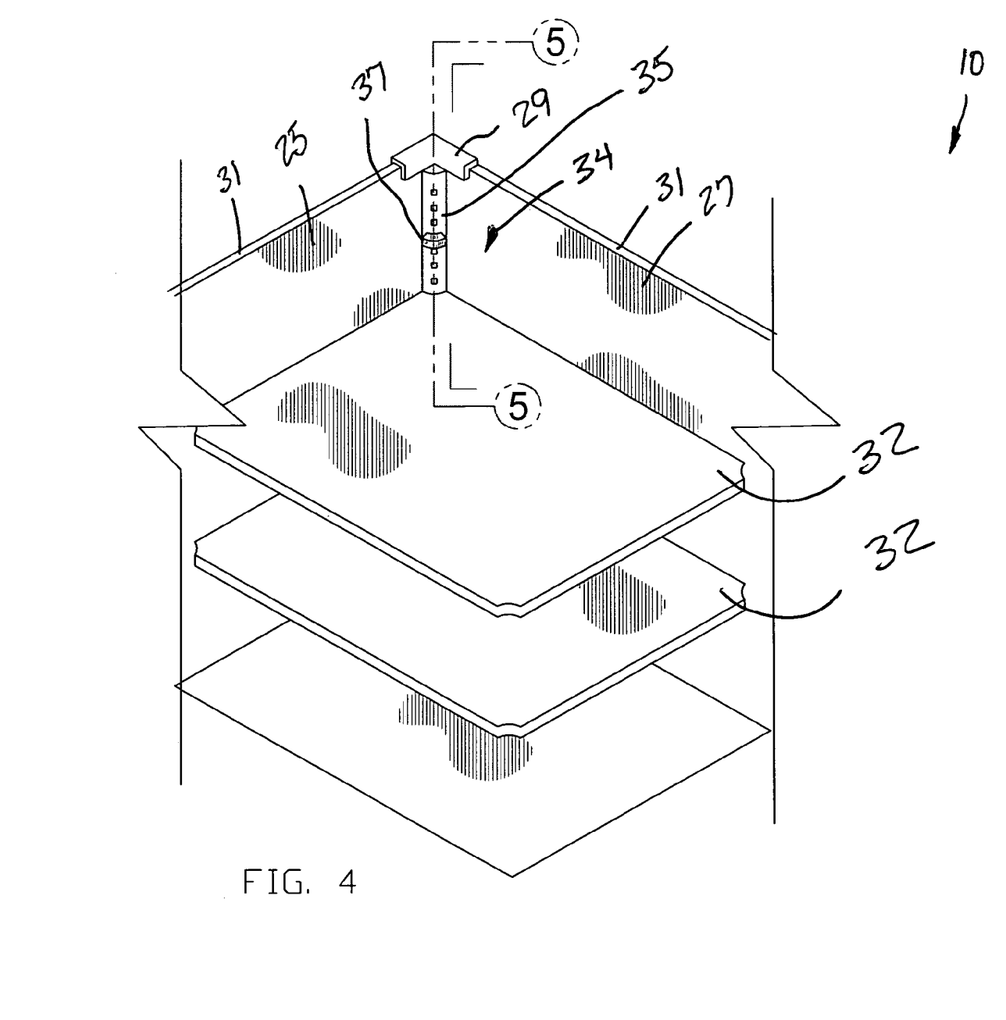
FIG. 4 is a broken view of the apparatus shown in FIG. 1.
Figure 5:
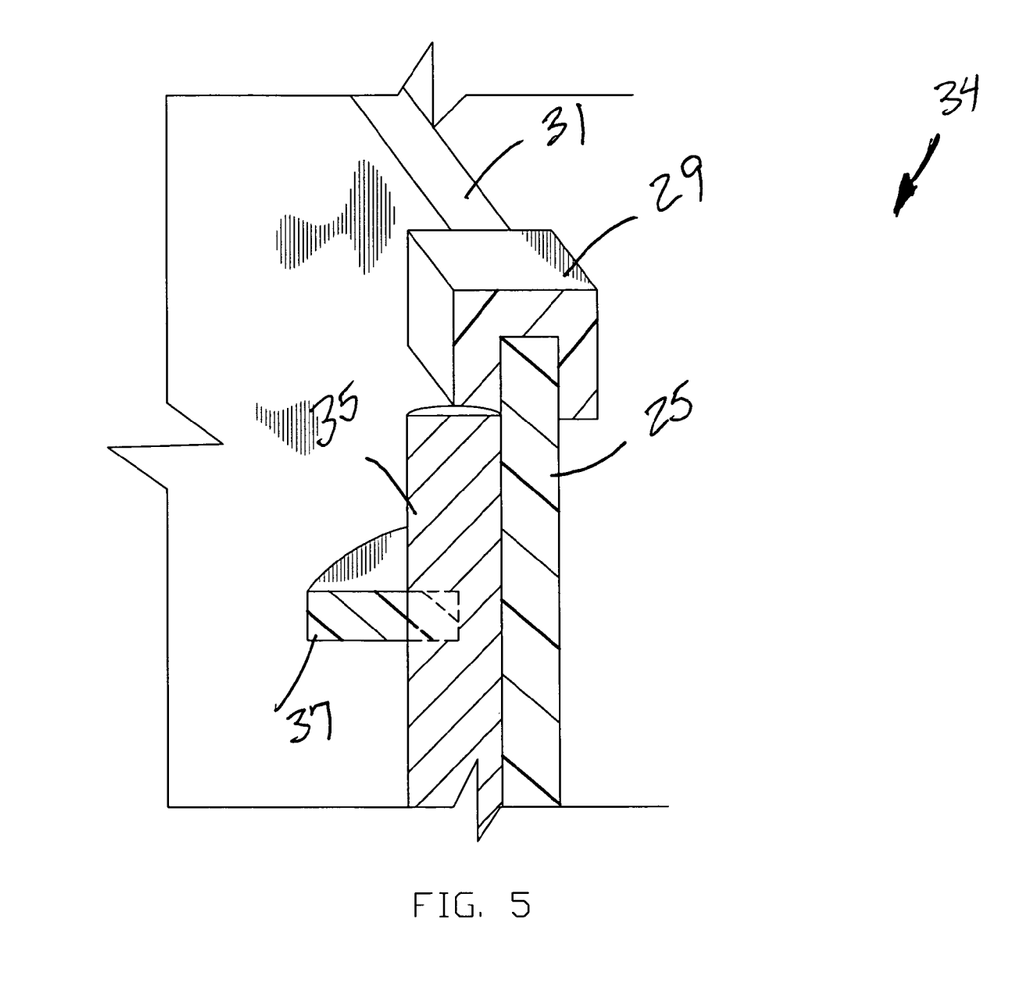
FIG. 5 is a cross sectional view of the system shown in FIG. 4, taken along line 5-5.
Figures 6, 7, 8:
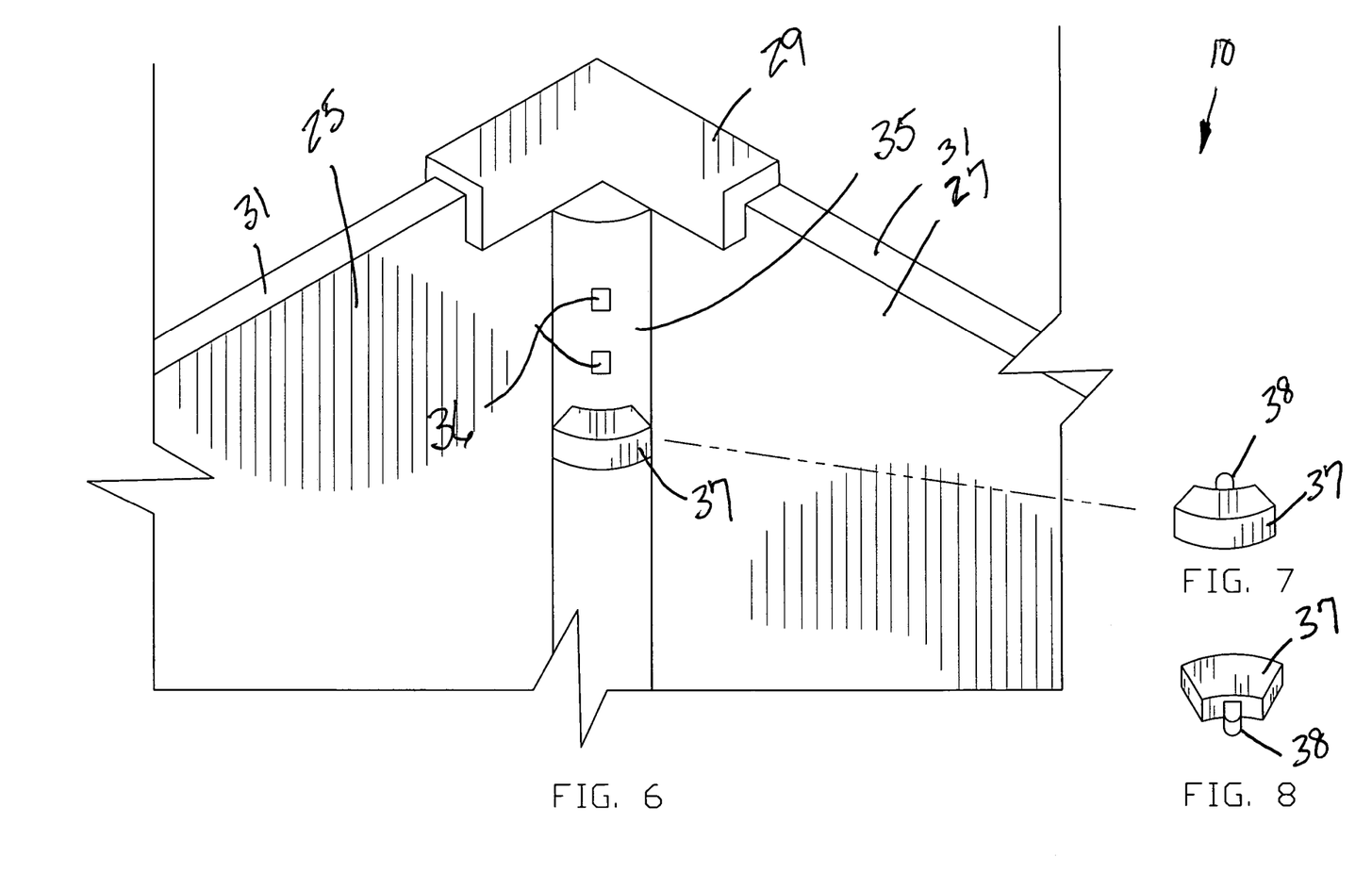
FIG. 6 is an expanded view of a rod, a peg, and an L-shaped bracket respectively.
FIG. 7 is a front perspective view of a peg.
FIG. 8 is a rear perspective view of a peg.
Figure 9:
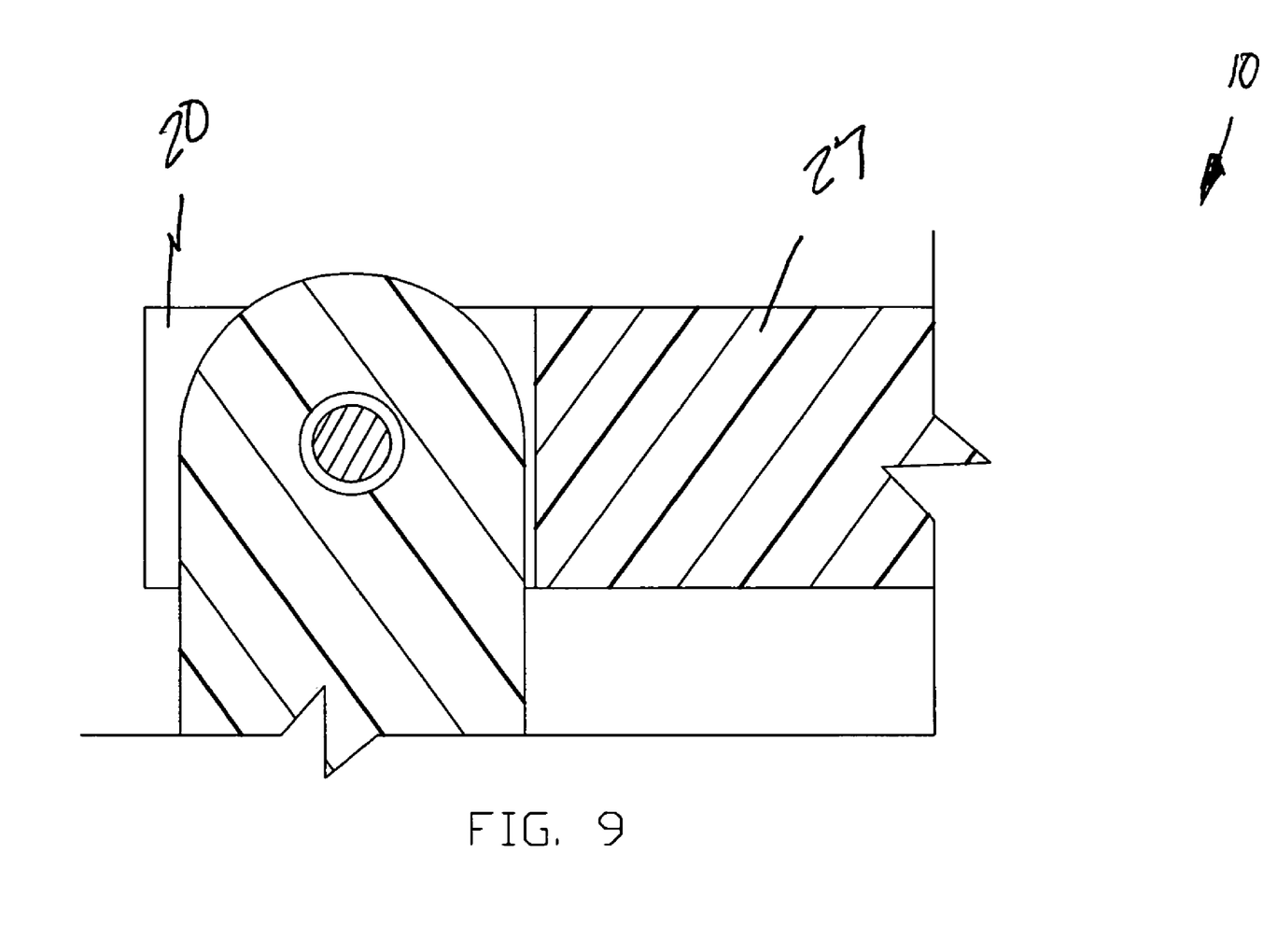
FIG. 9 is a cross sectional view of the system shown in FIG. 2, taken along line 9-9.
Figure 10:
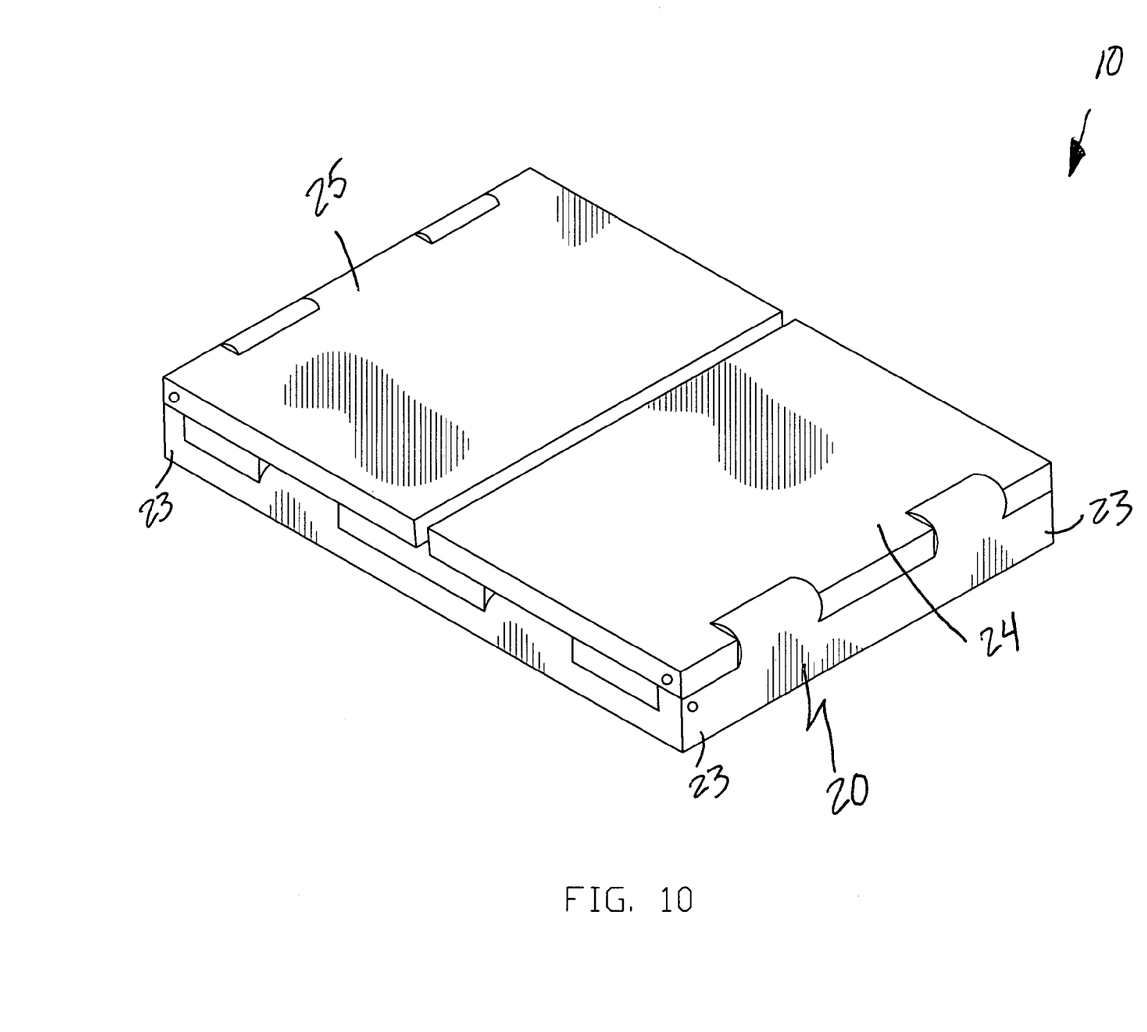
FIG. 10 is a perspective view of the system showing the walls biased inwardly to a horizontal position.

Referring to FIGS. 1, 3, and 4, a mechanism 34 adjustably and removably supports the shelves 32 within the cavity 30 such that the shelves 32 advantageously remain statically nested within the cavity 30 when the first, second, third, and fourth walls 24, 25, 26, 27 are biased to a horizontal and open position. The support mechanism 34 allows a user to place objects on one shelf 32 while other objects are placed on a vertically higher shelf 32, without the user having to worry that the higher shelf 32 will become undesirably dislodged, and thereby possibly damage the objects stored on the one shelf 32.

Referring to FIGS. 2, 4, 5, 6, 7 and 8, the shelves supporting mechanism 34 includes a plurality of elongated and rectilinear rods 35 vertically anchored within the apertures 22 and extending upwardly therefrom while advantageously remaining registered orthogonally to the bottom wall 20. Each of the rods 35 has a plurality of notches 36 formed therein, and each of the notches 36 is equidistantly juxtaposed along a longitudinal length of the rods 35. Such notches 36 face inwardly towards a center of the bottom wall 20. A plurality of pegs 37 has arcuate inner surfaces firmly abutted against associated ones of the rods 35, and each of the pegs 37 further has male portions 38 removably interfitted within the notches 36 such that the pegs 37 advantageously remain statically affixed to the rods 35 during transport procedures. Each of the shelves 32 is provided with arcuately shaped opposed corners directly engaged with an outer surface of the rods 35, without the use of intervening elements, and directly seated on the pegs 37, without the use of intervening elements, during transport procedures respectively.

Referring to FIGS. 11A and 11B, the spring-loaded caster assemblies 33 include a caster 40, and an anchor bracket 41 and a deformably resilient spring member 42 that has opposed ends directly engaged with a bottom surface of the anchor bracket 41, without the use of intervening elements, and a bottom surface of the bottom wall 20 respectively. It is noted that all the caster assemblies are identical in structure and operation and, therefore, only one caster assembly 33 will be described hereinbelow.

A linear axle 44 is directly coupled to the anchor bracket 41, without the use of intervening elements, and advantageously extends horizontally outward therefrom. The caster 40 is journaled about the axle 44. A deformably resilient arm 45 that has first 46 and second 47 portions is directly anchored to the bottom wall 20 and the axle 44 respectively, without the use of intervening elements. Such an arm 45 automatically flexes between compressed and elongated positions when the spring member 42 is biased between elongated and compressed positions respectively. Such caster assemblies 33 allow for 360 degree movement of the apparatus 10, thereby allowing the apparatus 10 to be easily and efficiently moved around objects and down passageways typically associated with storage areas.

The ability to independently and simultaneously articulate the first, second, third, and fourth walls 24, 25, 26, 27 provides the unexpected benefit of allowing a user to access selected portions of the cavity 30 as desired, without having to undesirably articulate each wall 24, 25, 26, 27 during operating conditions. In addition, such ability allows a user to transport and store elongated and odd-shaped objects safely and efficiently. Also, the ability to remove the caster assemblies 33 as desired provides a safety feature that overcomes the previously mentioned prior art shortcomings.

A method for storing and carrying objects between remote locations includes the steps of providing a bottom wall 20 that has a planar top surface 21 elevated above a ground surface during transport procedures. The bottom wall 20 has a plurality of apertures 22 formed in opposed corners 23 thereof respectively. The steps further include pivotally attaching first 24 and second 25 axially opposed walls to the bottom wall 20 and registered orthogonal to a centrally positioned longitudinal axis of the bottom wall 20, and pivotally attaching third 26 and fourth 27 walls to opposed longitudinal edges 28 of the bottom wall 20. The first and second walls 24, 25 pivot about first and second co-planar axes registered parallel to each other, and the third and fourth walls 26, 27 are pivotal about co-planar axes registered parallel to each other and further registered orthogonally to the axes of the first and second walls 24, 25. The axes of the first and second walls 24, 25 are disposed above the axes of the third and fourth walls 26, 27 respectively such that the first and second walls 24, horizontally lay directly on the third and fourth walls 26, 27 during non-transport procedures.

The steps further include removably mating a plurality of brackets 29 with the contiguously abutted top edges 31 of the first, second, third, and fourth walls 24, 25, 26, 27 such that a rectangular cavity 30 is defined within an interior perimeter of the first, second, third and fourth walls 24, 25, 26, 27 respectively, providing a plurality of shelves 32, adjustably mating a plurality of spring-loaded and detachable caster assemblies 33 to the bottom wall 20, and removably supporting the shelves 32 within the cavity 30 such that the shelves 32 remain statically nested within the cavity 30 when the first, second, third, and fourth walls 24, 25, 26, 27 are biased to a horizontal and open position.

The steps further include vertically anchoring a plurality of elongated and rectilinear rods 35 within the apertures 22 and extending upwardly therefrom while remaining registered orthogonally to the bottom wall 20. Each of the rods 35 has a plurality of notches 36 formed therein, and each of the notches 36 is equidistantly juxtaposed along a longitudinal length of the rods 35. The notches 36 face inwardly towards a center of the bottom wall 20. The steps further include firmly abutting a plurality of pegs 37 that have arcuate inner surfaces against associated ones of the rods 35. Each of the pegs 37 further has male portions 38 removably interfitted within the notches 36 such that the pegs 37 remain statically affixed to the rods 35 during transport procedures. Each of the shelves 32 is provided with arcuately shaped opposed corners directly engaged with an outer surface of the rods 35, without the use of intervening elements, and directly seated on the pegs 37, without the use of intervening elements, during transport procedures respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A collapsible transport cart for storing and carrying objects between remote locations, said collapsible transport cart comprising:
   a bottom wall having a planar top surface elevated above a ground surface during transport procedures, said bottom wall having a plurality of apertures formed in opposed corners thereof respectively;
   first and second axially opposed walls pivotally attached to said bottom wall and registered orthogonal to a centrally positioned longitudinal axis of said bottom wall;
   third and fourth walls pivotally attached to opposed longitudinal edges of said bottom wall;
   a plurality of brackets removably mated with contiguously abutted top edges of said first, second, third, and fourth walls such that a rectangular cavity is defined within an interior perimeter of said first, second, third and fourth walls respectively;
   a plurality of shelves;
   a plurality of spring-loaded and detachable caster assemblies adjustably mated to said bottom wall; and
   means for adjustably and removably supporting said shelves within said cavity such that said shelves remain statically nested within said cavity when said first, second, third, and fourth walls are biased to a horizontal and open position.

2. The collapsible transport cart of claim 1, wherein said shelves supporting means comprises:
   a plurality of elongated and rectilinear rods vertically anchored within said apertures and extending upwardly therefrom while remaining registered orthogonally to said bottom wall, each of said rods having a plurality of notches formed therein, each of said notches being equidistantly juxtaposed along a longitudinal length of said rods, said notches facing inwardly towards a center of said bottom wall; and
   a plurality of pegs having arcuate inner surfaces firmly abutted against associated ones of said rods, each of said pegs further having male portions removably interfitted within said notches such that said pegs remain statically affixed to said rods during transport procedures;
   wherein each of said shelves is provided with arcuately shaped opposed corners directly engaged with an outer surface of said rods and directly seated on said pegs during transport procedures respectively.

3. The collapsible transport cart of claim 1, wherein each of said spring-loaded caster assemblies comprises:
   a caster;
   an anchor bracket and a deformably resilient spring member having opposed ends directly engaged with a bottom surface of said anchor bracket and a bottom surface of said bottom wall respectively;
   a linear axle directly coupled to said anchor bracket and extending horizontally outward therefrom, said caster being journaled about said axle; and
   a deformably resilient arm having first and second portions directly anchored to said bottom wall and said axle respectively, wherein said arm automatically flexes between compressed and elongated positions when said spring member is biased between elongated and compressed positions respectively.

4. The collapsible transport cart of claim 1, wherein each of said first, second, third, and fourth walls are independently and simultaneously articulated about intersecting arcuate paths inwardly defined within a perimeter of said bottom wall.

5. The collapsible transport cart of claim 1, wherein each of said brackets is L-shaped.

6. A collapsible transport cart for storing and carrying objects between remote locations, said collapsible transport cart comprising:
- a bottom wall having a planar top surface elevated above a ground surface during transport procedures, said bottom wall having a plurality of apertures formed in opposed corners thereof respectively;
- first and second axially opposed walls pivotally attached to said bottom wall and registered orthogonal to a centrally positioned longitudinal axis of said bottom wall;
- third and fourth walls pivotally attached to opposed longitudinal edges of said bottom wall, wherein said first and second walls pivot about first and second co-planar axes registered parallel to each other, said third and fourth walls being pivotal about co-planar axes registered parallel to each other and further registered orthogonally to said axes of said first and second walls, said axes of said first and second walls being disposed above said axes of said third and fourth walls respectively such that said first and second walls horizontally lay directly on said third and fourth walls during non-transport procedures;
- a plurality of brackets removably mated with contiguously abutted top edges of said first, second, third, and fourth walls such that a rectangular cavity is defined within an interior perimeter of said first, second, third and fourth walls respectively;
- a plurality of shelves;
- a plurality of spring-loaded and detachable caster assemblies adjustably mated to said bottom wall; and
- means for adjustably and removably supporting said shelves within said cavity such that said shelves remain statically nested within said cavity when said first, second, third, and fourth walls are biased to a horizontal and open position.

7. The collapsible transport cart of claim 6, wherein said shelves supporting means comprises:
- a plurality of elongated and rectilinear rods vertically anchored within said apertures and extending upwardly therefrom while remaining registered orthogonally to said bottom wall, each of said rods having a plurality of notches formed therein, each of said notches being equidistantly juxtaposed along a longitudinal length of said rods, said notches facing inwardly towards a center of said bottom wall; and
- a plurality of pegs having arcuate inner surfaces firmly abutted against associated ones of said rods, each of said pegs further having male portions removably interfitted within said notches such that said pegs remain statically affixed to said rods during transport procedures;
- wherein each of said shelves is provided with arcuately shaped opposed corners directly engaged with an outer surface of said rods and directly seated on said pegs during transport procedures respectively.

8. The collapsible transport cart of claim 6, wherein each of said spring-loaded caster assemblies comprises:
- a caster;
- an anchor bracket and a deformably resilient spring member having opposed ends directly engaged with a bottom surface of said anchor bracket and a bottom surface of said bottom wall respectively;
- a linear axle directly coupled to said anchor bracket and extending horizontally outward therefrom, said caster being journaled about said axle; and
- a deformably resilient arm having first and second portions directly anchored to said bottom wall and said axle respectively, wherein said arm automatically flexes between compressed and elongated positions when said spring member is biased between elongated and compressed positions respectively.

9. The collapsible transport cart of claim 6, wherein each of said first, second, third, and fourth walls are independently and simultaneously articulated about intersecting arcuate paths inwardly defined within a perimeter of said bottom wall.

10. The collapsible transport cart of claim 6, wherein each of said brackets is L-shaped.

11. A method for storing and carrying objects between remote locations, said method comprising the steps of:
- a. providing a bottom wall having a planar top surface elevated above a ground surface during transport procedures, said bottom wall having a plurality of apertures formed in opposed corners thereof respectively;
- b. pivotally attaching first and second axially opposed walls to said bottom wall and registered orthogonal to a centrally positioned longitudinal axis of said bottom wall;
- c. pivotally attaching third and fourth walls to opposed longitudinal edges of said bottom wall, wherein said first and second walls pivot about first and second co-planar axes registered parallel to each other, said third and fourth walls being pivotal about co-planar axes registered parallel to each other and further registered orthogonally to said axes of said first and second walls, said axes of said first and second walls being disposed above said axes of said third and fourth walls respectively such that said first and second walls horizontally lay directly on said third and fourth walls during non-transport procedures;
- d. removably mating a plurality of brackets with contiguously abutted top edges of said first, second, third, and fourth walls such that a rectangular cavity is defined within an interior perimeter of said first, second, third and fourth walls respectively;
- e. providing a plurality of shelves;
- f. adjustably mating a plurality of spring-loaded and detachable caster assemblies to said bottom wall; and
- g. removably supporting said shelves within said cavity such that said shelves remain statically nested within said cavity when said first, second, third, and fourth walls are biased to a horizontal and open position.

12. The method of claim 11, further comprising the steps of:
- a. vertically anchoring a plurality of elongated and rectilinear rods within said apertures and extending upwardly therefrom while remaining registered orthogonally to said bottom wall, each of said rods having a plurality of notches formed therein, each of said notches being equidistantly juxtaposed along a longitudinal length of said rods, said notches facing inwardly towards a center of said bottom wall; and
- b. firmly abutting a plurality of pegs having arcuate inner surfaces against associated ones of said rods, each of said pegs further having male portions removably interfitted within said notches such that said pegs remain statically affixed to said rods during transport procedures;

wherein each of said shelves is provided with arcuately shaped opposed corners directly engaged with an outer surface of said rods and directly seated on said pegs during transport procedures respectively.

13. The method of claim 11, wherein each of said spring-loaded caster assemblies comprises:
 a caster;
 an anchor bracket and a deformably resilient spring member having opposed ends directly engaged with a bottom surface of said anchor bracket and a bottom surface of said bottom wall respectively;
 a linear axle directly coupled to said anchor bracket and extending horizontally outward therefrom, said caster being journaled about said axle; and
 a deformably resilient arm having first and second portions directly anchored to said bottom wall and said axle respectively, wherein said arm automatically flexes between compressed and elongated positions when said spring member is biased between elongated and compressed positions respectively.

14. The method of claim 11, wherein each of said first, second, third, and fourth walls are independently and simultaneously articulated about intersecting arcuate paths inwardly defined within a perimeter of said bottom wall.

15. The method of claim 11, wherein each of said brackets is L-shaped.

\* \* \* \* \*